US009033663B2

(12) United States Patent
Danielsen

(10) Patent No.: US 9,033,663 B2
(45) Date of Patent: May 19, 2015

(54) WIND TURBINE ROTOR AND METHOD OF CALIBRATING ROTOR BLADE PITCH

(75) Inventor: Niels Erik Danielsen, Brabrand (DK)

(73) Assignee: Vestas Wind Systems A/S, Aarhus N. (DK)

(*) Notice: Subject to any disclaimer, the term of this patent is extended or adjusted under 35 U.S.C. 154(b) by 974 days.

(21) Appl. No.: 13/058,398

(22) PCT Filed: Aug. 12, 2009

(86) PCT No.: PCT/DK2009/050200
§ 371 (c)(1),
(2), (4) Date: May 4, 2011

(87) PCT Pub. No.: WO2010/017820
PCT Pub. Date: Feb. 18, 2010

(65) Prior Publication Data
US 2011/0227342 A1 Sep. 22, 2011

Related U.S. Application Data

(60) Provisional application No. 61/089,101, filed on Aug. 15, 2008.

(30) Foreign Application Priority Data

Aug. 13, 2008 (DK) .................................. 2008 01091

(51) Int. Cl.
F03D 7/04 (2006.01)
F03D 11/00 (2006.01)
F03D 1/06 (2006.01)
F03D 7/02 (2006.01)
F16C 41/00 (2006.01)

(52) U.S. Cl.
CPC .......... F03D 11/0091 (2013.01); F03D 1/0658 (2013.01); F03D 7/0224 (2013.01);
(Continued)

(58) Field of Classification Search
CPC ......... F03D 7/0224; F03D 7/042; F03D 7/00; F03D 1/0658; F03D 11/0091; F05B 2270/328; F05B 2270/20; F05B 2270/80; F05B 2270/802; F05B 2260/80; B64C 11/301; B64C 11/44; B63H 2003/006; G01P 3/44; G01P 3/481; G01P 3/487
USPC ........ 416/1, 61, 25, 26, 27, 31, 147, 149, 150
See application file for complete search history.

(56) References Cited

U.S. PATENT DOCUMENTS 2,806,402 A * 9/1957 Ferris ........................ 250/231.14
5,865,599 A * 2/1999 Pruden et al. ................... 416/61
(Continued)

FOREIGN PATENT DOCUMENTS

DE 100 32 314 12/2001
DE 10 2004 014 323 10/2005
(Continued)

OTHER PUBLICATIONS

Anders Budtz-Olsen; 1st Technical Examination Report issued in priority Denmark Application No. PA 2008 01091; Mar. 31, 2009; 4 pages; Denmark Patent and Trademark Office.

Primary Examiner — Dwayne J White
Assistant Examiner — William Grigos
(74) Attorney, Agent, or Firm — Wood, Herron & Evans, LLP

(57) ABSTRACT

A wind turbine rotor includes a hub with a rotor blade mounted to a bearing of the hub wherein the rotor blade has a longitudinal axis extending in a radial direction relative to an axis of rotation of the hub, and the rotor blade is rotatable about its longitudinal axis whereby the pitch of the rotor blade is adjustable. The rotor blade has a tag such as an RFID tag fixed on the rotor blade at a predetermined angular position about the longitudinal axis of the rotor blade; and a sensor is fixed on the hub for contactless sensing of the tag when the tag is in a predetermined angular position about the longitudinal axis of the rotor blade. Repeated and accurate calibration of rotor blade pitch is hereby made possible.

8 Claims, 1 Drawing Sheet

(52) U.S. Cl.
CPC ......... *F05B2260/74* (2013.01); *F05B 2260/79* (2013.01); *F05B 2270/328* (2013.01); *F05B 2270/802* (2013.01); *F05B 2270/809* (2013.01); *F16C 2300/14* (2013.01); *Y02E 10/722* (2013.01); *Y02E 10/723* (2013.01); *Y02E 10/721* (2013.01); *F16C 41/007* (2013.01); *F16C 41/008* (2013.01)

(56) References Cited

U.S. PATENT DOCUMENTS

| | | | |
|---|---|---|---|
| 6,109,871 A * | 8/2000 | Nelson et al. | 416/36 |
| 6,213,713 B1 * | 4/2001 | Dickmann | 416/61 |
| 7,052,232 B2 * | 5/2006 | Wobben | 415/118 |
| 2007/0159346 A1 * | 7/2007 | Wesselink | 340/679 |
| 2009/0169357 A1 * | 7/2009 | Slack | 415/26 |
| 2009/0277266 A1 * | 11/2009 | Wang et al. | 73/514.01 |
| 2010/0098541 A1 * | 4/2010 | Benito et al. | 416/36 |

FOREIGN PATENT DOCUMENTS

| | | |
|---|---|---|
| EP | 1 653 079 | 5/2006 |
| WO | 2005/019642 | 3/2005 |
| WO | WO 2005019642 A1 * | 3/2005 |
| WO | 2007/098759 | 9/2007 |
| WO | 2008/119354 | 10/2008 |

* cited by examiner

WIND TURBINE ROTOR AND METHOD OF CALIBRATING ROTOR BLADE PITCH

FIELD OF THE INVENTION

The invention relates to wind turbine generators and in particular to calibration of the pitch angle of rotor blades having variable pitch.

BACKGROUND OF THE INVENTION

Wind turbine generators of today usually have rotor blades with variable pitch, i.e. the rotor blades can be rotated about their longitudinal axis. This is done in order to optimise operation of the generator and the rotor and of the individual rotor blades. Rotor blade pitch may be adjusted according to the actual working conditions such as wind speed and load of the generator, and rotor blade pitch may be adjusted individually for each rotor blade during each revolution of the rotor.

It is important to adjust rotor blade pitch accurately to the desired rotor blade pitch angle in order to achieve proper operation of the entire system and of each rotor blade. This requires proper calibration of the rotor blade pitch angle.

It is an object of the invention to provide a rotor for a wind turbine generator that makes repeated and accurate calibration of a rotor blade pitch angle according to the tip chord possible. It is also an object of the invention to provide a method of calibrating rotor blade pitch angle of a rotor blade for a wind turbine generator.

SUMMARY OF THE INVENTION

The invention therefore provides a wind turbine rotor comprising a hub with a rotor blade mounted to a bearing of the hub wherein the rotor blade has a longitudinal axis extending in a radial direction relative to an axis of rotation of the hub, and the rotor blade is rotatable about its longitudinal axis whereby the pitch of the rotor blade is adjustable, and the rotor blade has a tag fixed on the rotor blade at a predetermined angular position about the longitudinal axis of the rotor blade; and a sensor is fixed on the hub for contactless sensing of the tag when the tag is in a predetermined angular position about the longitudinal axis of the rotor blade.

Such a rotor is useful for repeated and accurate calibration of pitch angle of the rotor blades of wind turbines. If calibration of rotor blade pitch is desired the rotor blade is rotated about its longitudinal axis until the tag is in the predetermined angular position about the longitudinal axis of the rotor blade, which is where the sensor senses the tag. The sensor then outputs a corresponding signal to a controller which sets the sensed angular position as a reference angular position for calibration of the rotor blade pitch angle.

A tag that can be detected contactless, i.e. without being mechanically touched, can be detected e.g. magnetically or optically. A magnetically detectable tag can include a magnet, and a sensor for detecting it can include elements such as a reed element, a Hall effect element and an induction coil. An optically detectable tag can include a zone with optical properties that differ from those of the surroundings. Examples of such optical properties are colour, contrast, reflectance and refractive and diffractive properties.

However, a radio frequency identification (RFID) tag is preferred, and such a tag may have RF detectable data relating to the rotor blade such as its serial number and other production data, physical data such as the type of rotor blade, length, revision number, mass and centre of gravity, moment of inertia, angular offset of the tag relative to the tip chord etc. The angular position of the tag may be the tip chord angle of the rotor blade or be in a known relation thereto so that the tip chord angle of the rotor blade may be identified from the detected position of the tag.

The invention also provides a wind turbine generator with such a rotor with one or more rotor blades mounted on the hub so that the pitch of each rotor blade is adjustable by rotating the rotor blades about its longitudinal axis, and for each rotor blade the rotor has a sensor fixed on the hub for determining a predetermined angular position of the tag about the longitudinal axis of the rotor blade, such as radial alignment of the tag and the sensor. The blade pitch angle where radial alignment of the tag and the sensor occurs can then be taken as a reference pitch angle that can be used for calibrating the pitch angle of the rotor blades. The tag is preferably positioned at the angular position of the tip chord angle of the rotor blade or in a known relation thereto so that the tip chord angle of the rotor blade may be identified.

The invention results in easier and faster commissioning of wind turbines. Further, it prevents the turbine from running with an aerodynamic unbalance due to rotor blade pitch being out of calibration. Such unbalance could create extra fatigue stress on the turbine and can in extreme cases lead to catastrophic failure.

On a rotor blade for wind turbine generators with a diameter at the base (or root end) of e.g. 2 m, one degree in rotation about the longitudinal axis corresponds to a distance in the circumferential direction about the base of 17 mm. The position of a tag such as an RFID tag near the base can be detected with higher precision than that distance. This in turn implies that the rotor blade pitch angle can be calibrated with a corresponding accuracy, i.e. less than one degree.

DETAILED DESCRIPTION OF THE INVENTION

Figure 1:
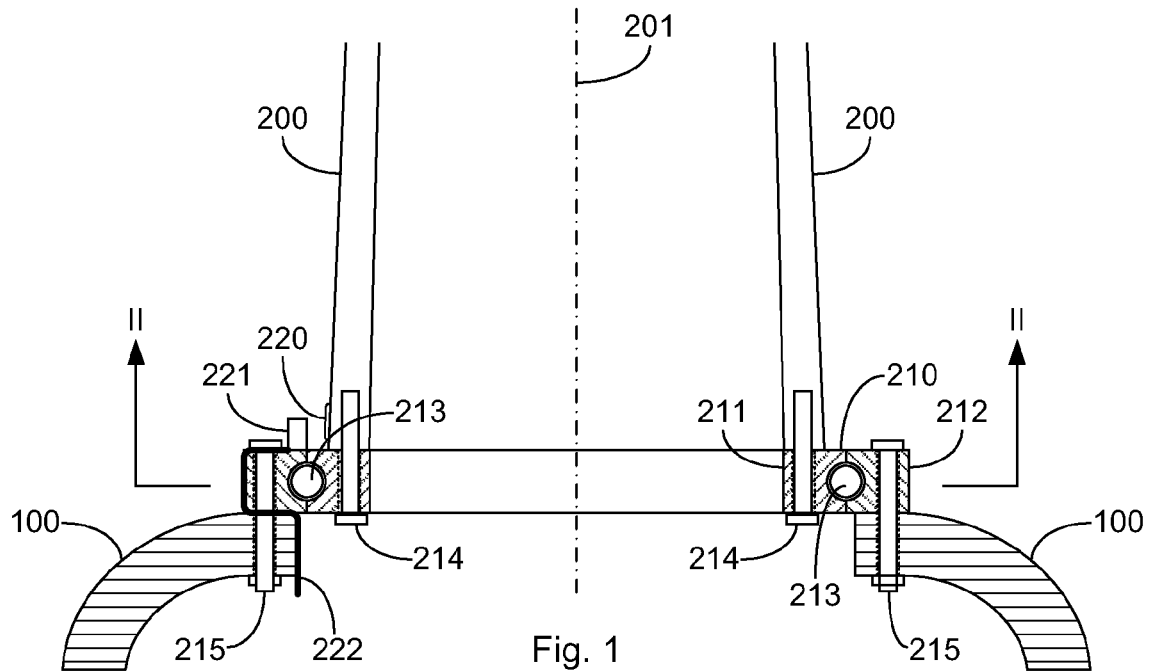
FIG. 1 illustrates an axial section through parts of a hub of a wind turbine generator with a rotor blade mounted thereon.
Figure 2:
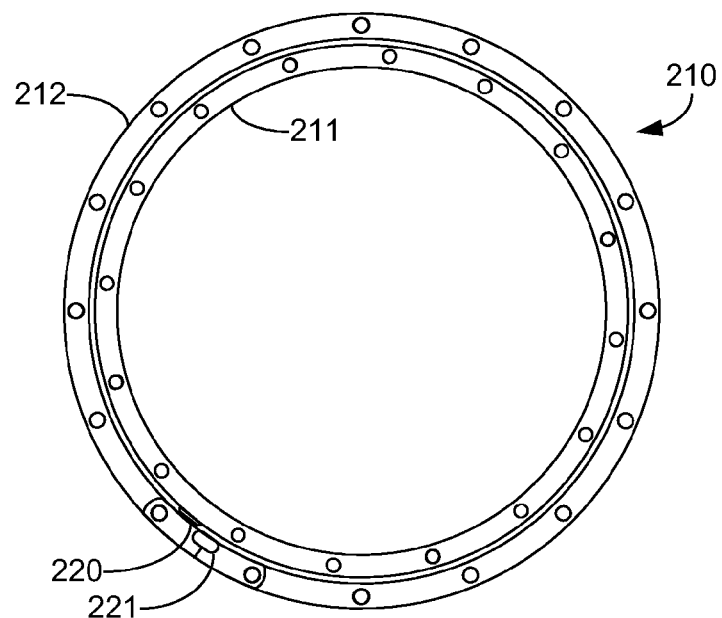
FIG. 2 illustrates a section through the root of the rotor blade taken along the line indicated by the arrows II-II in FIG. 1.

In FIG. 1 is shown a section through a hub 100 of a wind turbine generator. A rotor blade 200 is mounted on the hub by means of a rotor blade bearing 210. The blade bearing 210 has an inner bearing ring 211 secured to the base end of the blade 200 by means of bolts 214 and an outer bearing ring 212 secured to the hub 100 by means of bolts 215. The blade bearing 210 and its inner bearing ring 211 and outer bearing ring 212 are also shown in FIG. 2. Between the inner bearing ring 211 and the outer bearing ring 212 are balls or rollers 213 whereby the inner bearing ring 211, the outer bearing ring 212 and the balls or rollers 213 form a ball bearing or roller bearing for the rotor blade 200 so that the rotor blade can be rotated about its longitudinal axis 201 so as to adjust the rotor blade pitch angle. Means for adjusting the rotor blade pitch angle are not shown but can comprise e.g. electrically or hydraulically actuated means.

Near its base the rotor blade 200 has a radio frequency identification (RFID) tag 220 attached to the outer surface. On the outer ring 212 is mounted a sensor 221 that senses the presence of the tag 220 at an angular position about the longitudinal axis 201 of the rotor blade 200 with radial alignment of the tag 220 and the sensor 221. A sensor cable 222 connects the sensor 221 to control equipment (not shown) for processing signals from the sensor. A groove is provided in the hub to ensure that the sensor is mounted on a specified pair of bolts 215. This ensures that the sensor can only be mounted in the correct position.

In operation the hub will rotate about its axis of rotation which if drawn in FIG. 1 would be horizontal. A controller (not shown) controls an actuating mechanism (not shown) to rotate the inner bearing ring 211 with the rotor blade 200 mounted thereon to a desired rotor blade pitch angle, i.e. the angle of the tip chord relative to a plane perpendicular to the axis of rotation of the hub. The tip chord is a line segment at the tip of the rotor blade whose direction is defined as the direction between the leading and trailing edges of the rotor blade at the tip.

Calibration of the rotor blade pitch angle may be performed when the rotor blade 200 is in an angular position where the tag 220 is in radial alignment with the sensor 221 or within a narrow angular interval thereabout. In such position the rotor blade has a known pitch angle, e.g. zero degrees, and the controller takes this angle as a reference angle and calculates changes in rotor blade pitch angle from this reference angle.

The angular position of the rotor blade where the tag 220 and the sensor 221 are in radial alignment may be obtained routinely one or several times during the operation of the wind turbine generator or it may be obtained by the controller for the purpose of calibration of the rotor blade pitch angle. Thus, reliable calibration of the rotor blade pitch angle may be performed fast, repeatedly and in a simple manner as often as desired.

The invention claimed is:

1. A wind turbine rotor comprising a hub with a rotor blade mounted to a bearing of the hub wherein:
   the rotor blade has a longitudinal axis extending in a radial direction relative to an axis of rotation of the hub, and the rotor blade is rotatable about its longitudinal axis whereby the pitch of the rotor blade is adjustable, and the rotor blade has a tag fixed on the rotor blade at a predetermined angular position about the longitudinal axis of the rotor blade; and
   a sensor is fixed on the hub for contactless sensing of the tag when the tag is in the predetermined angular position about the longitudinal axis of the rotor blade.

2. The rotor according to claim 1 wherein the tag is a radio frequency identification (RFID) tag.

3. The rotor according to claim 2 wherein the tag has data relating to the rotor blade, the data being readable by radio frequency interaction with the tag.

4. The rotor according to claim 1 wherein the predetermined angular position of the tag about the longitudinal axis of the rotor blade identifies a tip chord angle of the rotor blade.

5. A wind turbine generator comprising a rotor according to claim 1.

6. A method of calibrating the pitch angle of the rotor blade of the wind turbine generator according to claim 5, the method comprising:
   rotating the rotor blade about its longitudinal axis to obtain the predetermined angular position of the tag about the longitudinal axis of the rotor blade; and
   setting the predetermined angular position of the tag about the longitudinal axis of the rotor blade as a reference pitch angle.

7. A method for calibrating a pitch angle of a rotor blade mounted to a hub of a wind turbine generator, the rotor blade having a longitudinal axis extending in a radial direction relative to an axis of rotation of the hub and a tag fixed to the rotor blade, the tag corresponding to a known pitch angle of the rotor blade, the method comprising:
   rotating the rotor blade about the longitudinal axis until a sensor and the tag are in radial alignment, the sensor being fixed to the hub; and
   in response to the sensor and tag being in radial alignment, setting the known pitch angle as a reference angle for calculating changes in the pitch angle of the rotor blade.

8. The method of claim 7, wherein rotating the rotor blade about the longitudinal axis until a sensor and the tag are in radial alignment comprises:
   sensing, by the sensor, a presence of the tag when the rotor blade has the known pitch angle.

\* \* \* \* \*